Dec. 31, 1940.   J. E. HAINES   2,226,815
PNEUMATIC CONTROLLER
Filed March 13, 1939

Inventor
John E. Haines
By George H. Fisher
Attorney

Patented Dec. 31, 1940

2,226,815

UNITED STATES PATENT OFFICE 2,226,815

PNEUMATIC CONTROLLER

John E. Haines, Chicago, Ill., assignor to Minneapolis-Honeywell Regulator Company, Minneapolis, Minn., a corporation of Delaware Application March 13, 1939, Serial No. 261,674

13 Claims. (Cl. 236—38)

This invention relates in general to automatic controls and more particularly to pressure actuated controls for air conditioning and ventilating systems.

In air conditioning and ventilating practice it has become usual to provide an automatically controlled fresh air damper for controlling the amount of fresh air supplied to a conditioned space. It is desirable in most installations to provide an arrangement for preventing the automatic damper control from closing the fresh air damper completely in order to insure that enough air for proper ventilation is always supplied to the conditioned space, and for permitting ready adjustment of the minimum position from a suitable point such as a control panel. Heretofore, this result has been achieved pneumatically by providing two separate motors for the fresh air damper, one motor being controlled by the thermostat or other automatic controller and the other motor being controlled by a graduate switch on the control panel, there being a lost motion connection between the damper and the second motor so that this motor does not interfere with the control by the first motor when the damper is open beyond the minimum position. While this arrangement has generally been satisfactory, it is nevertheless relatively expensive due to the necessity of the two damper motors and the special linkage. Also this arrangement is subject to the usual defect in pneumatic control systems of not causing the damper to positively assume the position demanded by its controller.

It is an object of this invention to provide a pneumatic control arrangement for a fresh air damper which provides for a remotely adjustable minimum position, which requires only a single motor for positioning the damper, and which positively causes the damper to assume the exact position demanded by its controller.

A further object of this invention is the provision of a device for positively positioning a pneumatic motor in accordance with the demand of its controller and which incorporates an arrangement for preventing the controller from causing the motor to travel beyond a predetermined limit.

Other objects will appear from the following description and the appended claims.

Figure 1:
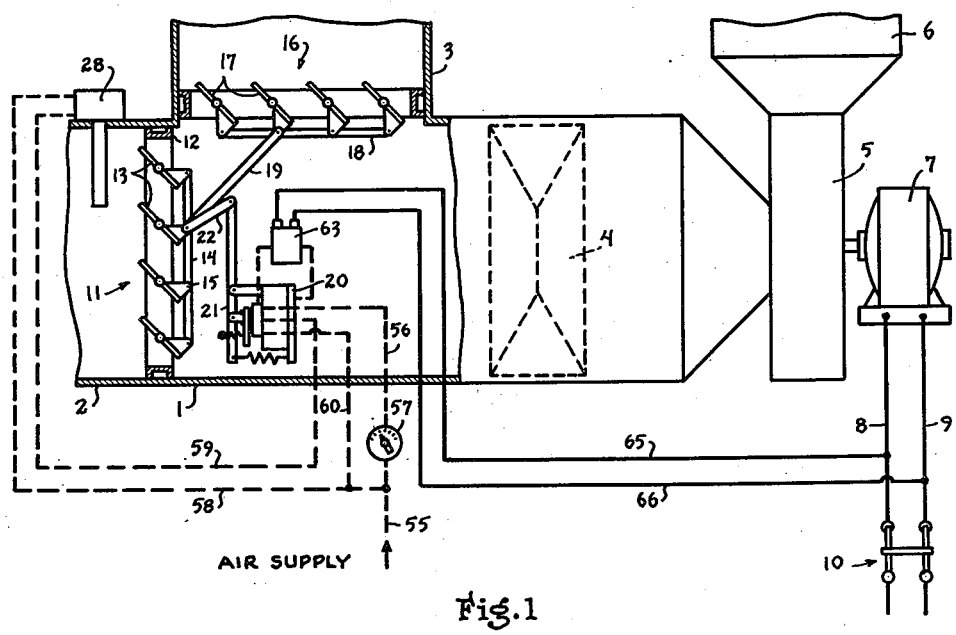
Figures 2, 2A:
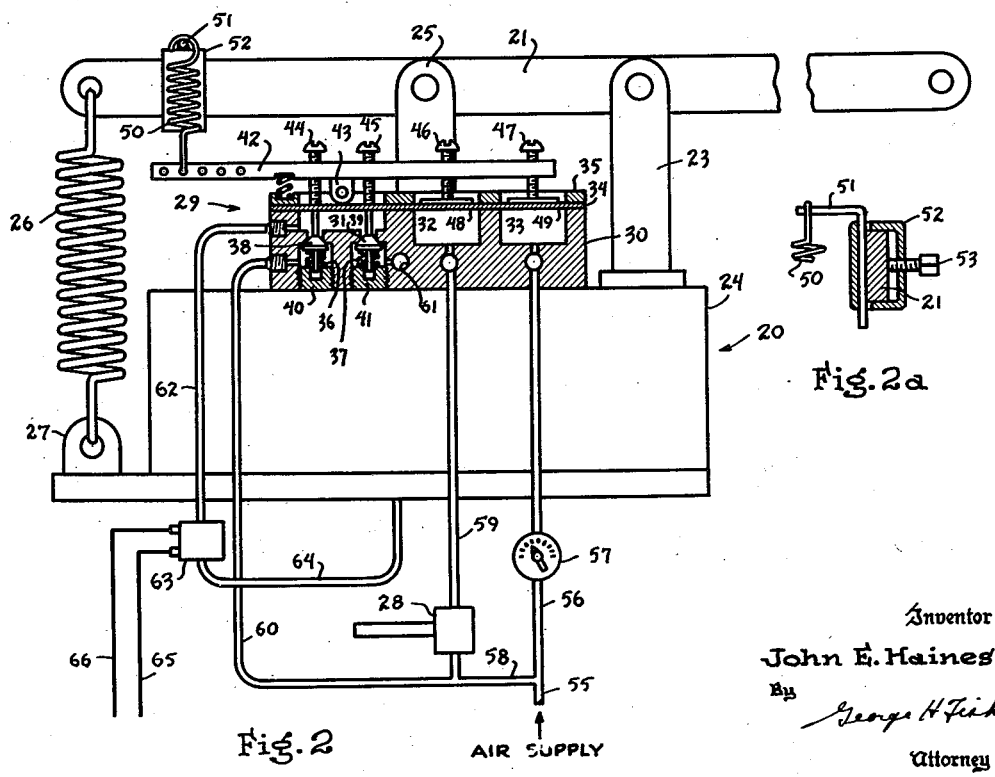

For a full disclosure of this invention reference is made to the following detailed description and to the accompanying drawing, in which Figure 1 indicates diagrammatically an air conditioning chamber having a fresh air damper controller embodying this invention, and in which Figure 2 shows the damper motor and control in detail.

Figure 2a shows the means for attaching the follow-up spring to the lever arm.

Referring to Figure 1 reference character 1 indicates an air conditioning chamber having a fresh air inlet 2 and a return air inlet 3 which leads from the conditioned space. This chamber contains the usual air conditioning apparatus 4 which may be a heating coil or cooling coil or other means for heating and/or cooling. The discharge end of this chamber is connected to a fan 5 which in turn discharges into a discharge duct 6. The fan 5 is driven by an electric motor 7 having power supply wires 8 and 9 connected to a control switch 10.

Located in the fresh air duct 2 is a fresh air damper generally indicated as 11, this damper being of usual form comprising a frame 12 pivotally supporting a plurality of damper blades 13 which are connected together by means of a link 14 which is attached to ears 15 mounted upon the damper blades. Within the return air inlet 3 is a return air damper 16 which is of the same type as fresh air damper 11, having a plurality of damper blades 17 which are connected together by a link 18. The links 14 and 18 are connected together by a suitable cross connecting member 19 which causes the fresh air damper and the return air damper to move in unison but in opposite manners, thus as the fresh air damper opens the return air damper closes and vice versa.

The dampers 11 and 16 are actuated by a pneumatic damper motor 20 having a lever arm 21 connected by a link 22 to one blade of the fresh air damper 11.

Referring now to Figure 2, the lever 21 of the damper motor is fixedly pivoted to a bracket 23 which is mounted upon the diaphragm casing 24 of the damper motor. This lever arm is also pivotally connected to a push member 25 which extends into the diaphragm casing 24 and rests upon the usual diaphragm (not shown) which is located in the diaphragm casing. The lever arm 21 is also attached to a spring 26, the lower end of which is secured to an ear 27 mounted upon the base of the diaphragm casing. It will be apparent that spring 26 serves to rotate the lever arm 21 in a counterclockwise direction, this action closing the fresh air damper 11 and opening the return air damper 16. It will also be apparent that the diaphragm of the damper motor serves to rotate the lever arm 21 in the clockwise direction against the action of spring 26 for thereby opening fresh air damper 11 and closing return air damper 16.

The damper motor 20 is controlled by means of a thermostat 28, which for illustrative purposes is shown in the fresh air duct 2. This thermostat controls the motor 20 through the positive positioner 29. This positive positioner has a base member 30 having therein a valve chamber 31 and diaphragm chambers 32 and 33 all of which are covered by a diaphragm 34 which is held in place by a plate 35. The base member 30 is also provided with valve bores 36 and 37 which communicate with the valve chamber 31 through valve ports as shown. Cooperating with the valve ports are valve members 38 and 39, these valve members each having a stem which extends through the respective valve port to the diaphragm 34. Also, these valve members include guides which fit into plugs 40 and 41 which cover the valve bores. Suitable springs are provided between the valve members and the plugs for biasing these valve members against their respective valve seats.

Reference character 42 indicates a valve lever arm having an extension 43 which is pivoted to the plate 35 between the valve members 38 and 39. This valve lever 42 is provided with screws 44 and 45 which engage the valve members 38 and 39, respectively, through the diaphragm 34. The valve lever 42 is also provided with screws 46 and 47 which engage the diaphragm portions 48 and 49 of diaphragm 34 which cover diaphragm chambers 32 and 33, respectively. It will be apparent that when the valve lever 42 is in the neutral or intermediate position, the valve members 38 and 39 will both engage their respective valve ports. However if the lever 42 is rocked in a counter-clockwise direction the valve 38 will be opened and conversely if the lever 42 is rocked clockwise from its intermediate position the valve 39 will be opened.

Attached to the left hand end of valve lever 42 is a spring 50. The upper end of this spring is attached to a pin 51 which is frictionally held between the lever arm 21 and a collar 52 which is mounted upon the lever arm 21 and held in place by a set screw 53. It will be apparent that the spring 50 urges the lever 42 in a clockwise direction while the diaphragm portions 48 and 49 urge this lever in the opposite direction. Inasmuch as the tension of spring 50 varies with the position of lever arm 21, the position of lever 42 varies in accordance with the pressures applied to diaphragm chambers 32 and 23 and with the position of lever arm 21.

Reference character 55 indicates an air supply pipe which is connected to a pipe 56 having a manually actuated graduate switch 57 located therein. This pipe 56 is also connected to the diaphragm chamber 33 of the positive positioner 29. The graduate switch 57 is in the nature of a manually adjustable pressure reducing valve and provides for applying any desired pressure from zero to the full supply line pressure to the diaphragm chamber 33.

The air supply pipe 55 is also connected to a pipe 58 leading to the thermostat 28 and this thermostat is connected by a pipe 59 to the diaphragm chamber 32. This thermostat may be of any desired type and for illustrative purposes this thermostat may be considered as being of the direct acting type which increases the pressure applied to diaphragm chamber 32 upon increase in outside temperature.

The air supply pipe 55 additionally communicates with pipe 60 which leads to a connection in the positive positioner 29 which communicates with the valve bore 36. The valve member 38 may therefore be considered as an air supply valve which controls the admission of air under pressure into the valve chamber 31. The valve bore 37 for valve 39 communicates with a vent port 61 and the valve 39 therefore controls the venting of air from valve chamber 31. The valve chamber 31 is in turn connected to a pipe 62 leading to an electric-pneumatic relay 63 and this relay is connected by pipe 64 to the diaphragm within the damper motor 20. The electric-pneumatic relay 63 may be of any form as known in the art and serves when energized to place the pipes 62 and 64 in communication. This electric-pneumatic relay is connected by wires 65 and 66 to the power wires 8 and 9 for the fan motor 7, and is thus energized when the fan is running for placing pipes 62 and 64 in communication so that the positive positioner 29 controls the admission and exhausting of air to and from the motor 20. However when the fan 7 is stopped, this electric-pneumatic relay is de-energized for blocking off the pipe 62 and placing the pipe 64 in communication with atmosphere for thereby completely venting the damper motor 20.

With the parts in the position shown, the fan switch is closed for thereby placing the fan in operation and energizing the electric-pneumatic relay 63 which places the positive positioner in control of the damper motor 20. At this time the setting of the graduate switch 57 and the temperature at thermostat 28 is such that the combined forces produced by the diaphragm portions 48 and 49 upon the valve lever 42 has caused the valve motor to place the dampers in mid-position wherein the tension of spring 50 is just sufficient to balance these combined forces for maintaining the valve lever 42 in intermediate position. If the temperature at thermostat 28 should increase, the pressure applied to the diaphragm portion 48 will now increase thereby overcoming the tension of spring 50 and rocking the valve lever 42 for opening the supply valve 38. This will permit air under pressure to flow from the supply line into the valve chamber 31 and through pipe 62, electric-pneumatic relay 63 and pipe 64 into the motor diaphragm which is thereby caused to expand against the action of spring 26 for rotating the lever arm 21 clockwise which causes opening movement of the fresh air damper 11 and closing movement of the return air damper 16. As the lever 21 rotates in this direction, the tension of spring 50 will graduatingly increase thereby tending to rock the valve lever back to the intermediate position for closing the supply valve. It will be apparent that when the lever 21 rotates to a position in which the new tension of spring 50 just balances the new applied pressure, the valve lever 42 will reassume the intermediate position and the motor will remain stationary in its new position.

Assuming that the temperature at thermostat 28 decreases, this thermostat will decrease the pressure applied to diaphragm chamber 32 thereby decreasing the force tending to maintain the valve lever 42 in neutral position. The tension of spring 50 will now overcome the combined forces of diaphragm portions 48 and 49 thus rocking the valve lever 42 in clockwise direction for opening the vent valve 39. This will permit air to pass from the motor 20 to atmosphere thus permitting the spring 26 to rotate the lever arm 21 in the counter-clockwise direction for closing fresh air damper 11 and opening return air damper 16. This movement of lever arm 21 will decrease the tension on spring 50 and when the lever arm 21 assumes the proper position the new tension on spring 50 will just balance the reduced applied pressure and the valve lever 42 will thus be returned to the neutral or intermediate position for closing valve 39.

It will be apparent that due to the diaphragm portion 49 of the positive positioner, the valve lever 42 will be urged in the counter-clockwise direction even though the temperature at thermostat 28 may fall to such a value as to cause the pressure in diaphragm chamber 32 to be reduced to zero. This will prevent the thermostat 28 from completely closing the fresh air damper and thus provides for maintaining at all times an adequate supply of fresh air for ventilation purposes. It will also be apparent that the graduate switch 57 provides for varying the pressure applied to the diaphragm chamber 33 and therefore permits this minimum position to be readily adjusted from a remote point such as a central panel or control board.

When the fan 7 is placed out of operation by opening the switch 10, the electric-pneumatic relay 63 will be deenergized for thus venting the damper motor 20 which causes the spring 26 to completely close the fresh air damper 11. This invention therefore provides for positively controlling a pneumatic fresh air damper motor to cause it to assume the exact position demanded by its controller. The invention also provides for maintaining a predetermined minimum supply of fresh air which can be adjusted from a remote point, this action occurring whenever the air conditioning system is in operation. However, when the air conditioning system is out of operation, the fresh air damper will be closed irrespective of the temperature at the controlling thermostat or of the position of the minimum position controller.

While this invention has particular utility for controlling fresh air dampers of air conditioning systems it will be understood that the invention is not limited to this particular application. Also while I have shown and described a preferred embodiment of this invention it will be apparent that many changes may be made which are within the scope of this invention. I therefore desire to be limited only by the scope of the appended claims.

I claim as my invention:

1. In a system of the class described, in combination, a device to be controlled, a pressure actuated motor for moving said device to be controlled, valve means for controlling the admission and exhaust of actuating fluid to and from said pressure actuated motor, means including a pressure responsive device and an element actuated by said pressure actuated motor for conjointly controlling said valve means to cause movement of said pressure actuated motor in relationship to changes in pressure applied to said pressure responsive device, a condition responsive pressure controller for controlling the pressure applied to said pressure responsive device to thereby cause positioning of said device to be controlled in accordance with the value of the condition to which said condition responsive controller responds, and means for preventing said condition responsive controller from causing movement of said device to be controlled beyond a predetermined limit, said last mentioned means comprising a device acting on said valve means.

2. In a system of the class described, in combination, a device to be controlled, a pressure actuated motor for moving said device to be controlled, valve means for controlling the admission and exhaust of actuating fluid to and from said pressure actuated motor, means including a pressure responsive device and an element actuated by said pressure actuated motor for conjointly controlling said valve means to cause movement of said pressure actuated motor in relationship to changes in pressure applied to said pressure responsive device, a condition responsive pressure controller for controlling the pressure applied to said pressure responsive device to thereby cause positioning of said device to be controlled in accordance with the value of the condition to which said condition responsive controller responds, and means for preventing said condition responsive controller from causing movement of said device to be controlled beyond a predetermined limit, said last mentioned means comprising second pressure responsive device acting upon said valve means independently of said first pressure responsive device, and means for varying the pressure applied to said second pressure responsive device.

3. In a system of the class described, in combination, a device to be controlled, a pressure actuated motor for moving said device to be controlled, valve means for controlling the admission and exhaust of actuating fluid to and from said pressure actuated motor, a lever having a fixed pivot for actuating said valve means, means including a pressure responsive device and a member actuated by said pressure actuated motor for conjointly controlling the position of said lever in a manner to vary the motor position in relationship to changes in pressure applied to said pressure responsive device, and means acting on said lever means and tending to rotate said lever about its pivot independently of said pressure responsive device, for thereby limiting movements of said pressure actuated motor in one direction.

4. In a system of the class described, in combination, a device to be controlled, a pressure actuated motor for moving said device to be controlled, valve means for controlling the admission and exhaust of actuating fluid to and from said pressure actuated motor, a lever having a fixed pivot for actuating said valve means, a pressure responsive device tending to move said lever in one direction, a spring tending to move said lever in the opposite direction, said spring being actuated by said motor in a manner to cause the travel of the motor to be proportionate to changes in pressure applied to said pressure responsive device, and a second pressure responsive device acting upon said lever and urging said lever in one direction independently of said first pressure responsive device for preventing said first pressure responsive device from causing movement of said motor in one direction beyond a predetermined limit.

5. In a system of the class described, in combination, a device to be controlled, a pressure actuated motor for moving said device to be controlled, valve means for controlling the admission and exhaust of actuating fluid to and from said pressure actuated motor, a lever having a fixed pivot for actuating said valve means, a pressure responsive device tending to move said lever in one direction about its pivot, a spring tending to move said lever in the opposite direction, said spring being actuated by said motor in a manner to cause the travel of the motor to be proportionate to changes in pressure applied to said pressure responsive device, a condition responsive pressure controller for controlling the pressure applied to said pressure responsive device to thereby cause positioning of said device to be controlled in accordance with the value of the condition to which the condition responsive controller responds, and means for preventing said condition responsive controller from causing movement of said device to be controlled beyond a predetermined limit, said last mentioned means comprising a member for loading said lever against the action of said spring independently of said pressure responsive device.

6. In a system of the class described, in combination, a device to be controlled, a pressure actuated motor for moving said device to be controlled, valve means for controlling the admission and exhaust of actuating fluid to and from said pressure actuated motor, a lever having a fixed pivot for actuating said valve means, a pressure responsive device tending to move said lever in one direction about its pivot, a spring tending to move said lever in the opposite direction, said spring being actuated by said motor in a manner to cause the travel of the motor to be proportionate to changes in pressure applied to said pressure responsive device, a condition responsive pressure controller for controlling the pressure applied to said pressure responsive device to thereby cause positioning of said device to be controlled in accordance with the value of the condition to which the condition responsive controller responds, means for preventing said condition responsive controller from causing movement of said device to be controlled beyond a predetermined limit, said last mentioned means comprising a second pressure responsive device acting on said lever and urging it in one direction about its pivot independently of said first pressure responsive device, and means for varying the pressure applied to said second pressure responsive device.

7. In an air conditioning system, in combination, a fresh air damper, a pressure actuated motor for shifting said fresh air damper from one position to another, valve means for controlling the admission and exhaust of actuating fluid to and from said pressure actuated motor, means including a pressure responsive device and an element actuated by said motor for conjointly controlling said valve means to cause movement of said damper in relationship to changes in pressure applied to said pressure responsive device, a condition responsive pressure controller for varying the pressure applied to said pressure responsive device in accordance with changes in value of the condition to which the condition responsive controller responds to thereby automatically control said damper, and means for preventing said condition responsive controller from closing said damper beyond a predetermined minimum, said last mentioned means comprising a device acting on said valve means.

8. In an air conditioning system, in combination, a fresh air damper, a pressure actuated motor for shifting said fresh air damper from one position to another, valve means for controlling the admission and exhaust of actuating fluid to and from said pressure actuated motor, means including a pressure responsive device and an element actuated by said motor for conjointly controlling said valve means to cause movement of said damper in relationship to changes in pressure applied to said pressure responsive device, a condition responsive pressure controller for varying the pressure applied to said pressure responsive device in accordance with changes in value of the condition to which the condition responsive controller responds to thereby automatically control said damper, and means for preventing said condition responsive controller from closing said damper beyond a predetermined minimum, said last mentioned means comprising a second pressure responsive device acting on said valve means, and means for varying the pressure applied to said second pressure responsive device from a remote point.

9. In a system of the class described, in combination, a flow controller for controlling the flow of a medium, a pressure actuated motor for shifting said flow controller from substantially closed position to open position, valve means for controlling the admission and exhaust of actuating medium to and from said pressure actuated motor, means including a pressure responsive device and an element actuated by said motor for conjointly controlling said valve means to cause movement of the flow controller in relationship to changes in pressure applied to said pressure responsive device, a condition responsive control means for varying the pressure applied to said pressure responsive device in accordance with changes in value of the condition to which said condition responsive control means responds to thereby automatically control said flow controller, means for normally preventing said condition responsive control means from causing said flow controller to close beyond a predetermined point irrespective of the value of said condition, said last mentioned means comprising a second pressure responsive device acting on said valve means independently of said first pressure responsive device, and means for varying the pressure applied to said second pressure responsive device from a remote point.

10. In a system of the class described, in combination, a flow controller for controlling the flow of a medium, a pressure actuated motor for shifting said flow controller from substantially closed position to open position, valve means for controlling the admission and exhaust of actuating medium to and from said pressure actuated motor, means including a pressure responsive device and an element actuated by said motor for conjointly controlling said valve means to cause movement of the flow controller in relationship to changes in pressure applied to said pressure responsive device, a condition responsive control means for varying the pressure applied to said pressure responsive device in accordance with changes in value of the condition to which said condition responsive control means responds to thereby automatically control said flow controller, means for normally preventing said condition responsive control means from causing said flow controller to close beyond a predetermined point irrespective of the value of said condition, said last mentioned means comprising a second pressure responsive device acting on said valve means independently of said first pressure responsive device, means for varying the pressure applied to said second pressure responsive device from a remote point, second valve means for also controlling said motor means, said second valve means having a first position for causing said flow controller to be placed under the control of the first recited valve means and a second position for causing said motor means to move said flow controller to closed position independently of said first valve means, and means for operating said valve means between said first and second positions.

11. In a system of the class described, in combination, a flow controller for controlling the flow of a medium, a pressure actuated motor for shifting said flow controller from substantially closed position to open position, valve means for controlling the admission and exhaust of actuating medium to and from said pressure actuated motor, a lever having a fixed pivot for operating said valve means, means including a pressure responsive device and an element actuated by said motor for conjointly actuating said lever to cause movement of the flow controller in relationship to changes in pressure applied to said pressure responsive device, a condition responsive control means for varying the pressure applied to said pressure responsive device in accordance with changes in value of the condition to which said condition responsive control means responds to thereby automatically control said flow controller, means for normally preventing said condition responsive control means from causing said flow controller to close beyond a predetermined point irrespective of the value of said condition, said last mentioned means comprising a second pressure responsive device tending to rotate said lever about its fixed pivot independently of said first pressure responsive device, and means for varying the pressure applied to said second pressure responsive device from a remote point.

12. In a system of the class described, in combination, a flow controller for controlling the flow of a medium, a pressure actuated motor for shifting said flow controller from substantially closed position to open position, valve means for controlling the admission and exhaust of actuating medium to and from said pressure actuated motor, a lever having a fixed pivot for operating said valve means, means including a pressure responsive device and an element actuated by said motor for conjointly actuating said lever to cause movement of the flow controller in relationship to changes in pressure applied to said pressure responsive device, a condition responsive control means for varying the pressure applied to said pressure responsive device in accordance with changes in value of the condition to which said condition responsive control means responds to thereby automatically control said flow controller, means for normally preventing said condition responsive control means from causing said flow controller to close beyond a predetermined point irrespective of the value of said condition, said last mentioned means comprising a second pressure responsive device tending to rotate said lever about its fixed pivot independently of said first pressure responsive device, means for varying the pressure applied to said second pressure responsive device from a remote point, second valve means for also controlling said motor means, said second valve means having a first position for causing said flow controller to be placed under the control of the first recited valve means and a second position for causing said motor means to move said flow controller to closed position independently of said first valve means, and means for operating said valve means between said first and second positions.

13. In a system of the class described, in combination, a flow controller for controlling the flow of a medium, a pressure actuated motor for shifting said flow controller from substantially closed position to open position, valve means for controlling the admission and exhaust of actuating medium to and from said pressure actuated motor, means including a pressure responsive device and an element actuated by said motor for conjointly controlling said valve means to cause movement of the flow controller in relationship to changes in pressure applied to said pressure responsive device, a condition responsive control means for varying the pressure applied to said pressure responsive device in accordance with changes in value of the condition to which said condition responsive control means responds to thereby automatically control said flow controller, means for normally preventing said condition responsive control means from causing said flow controller to close beyond a predetermined point irrespective of the value of said condition, second valve means for also controlling said motor means, said second valve means having a first position for causing said flow controller to be placed under the control of the first recited valve means and a second position for causing said motor means to move said flow controller to closed position independently of said first valve means, and means for operating said valve means between said first and second positions.

JOHN E. HAINES.